Figure 1:
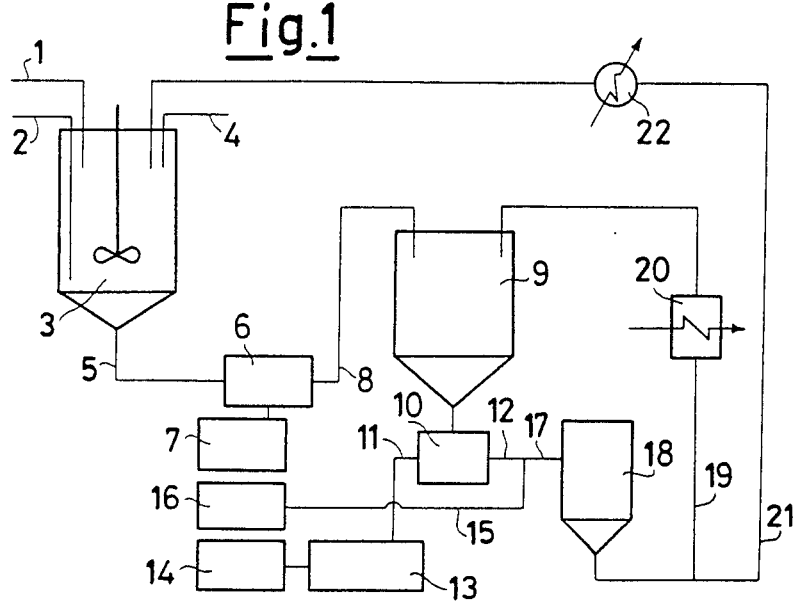

United States Patent [19]

Anastasi et al.

[11] Patent Number: 4,632,813
[45] Date of Patent: Dec. 30, 1986

[54] PROCESS FOR THE PRODUCTION OF WATER SOLUBLE AMMONIUM PHOSPHATES

[75] Inventors: Filippo Anastasi; Guido Anania; Vito Cultrera; Giuseppe Carfi', all of Gela, Italy

[73] Assignee: Enichem Agricolutra, Palermo, Italy

[21] Appl. No.: 722,315

[22] Filed: Apr. 11, 1985

[30] Foreign Application Priority Data

Apr. 18, 1984 [IT] Italy ............................... 20586 A/84

[51] Int. Cl.$^4$ .............................................. C01B 25/28
[52] U.S. Cl. ..................................... 423/310; 423/313
[58] Field of Search ............................. 423/310, 313

[56] References Cited

U.S. PATENT DOCUMENTS 4,325,927  4/1982  Weston et al. ...................... 423/310

Primary Examiner—John Doll
Assistant Examiner—Wayne A. Langel
Attorney, Agent, or Firm—Hedman, Gibson, Costigan & Hoare

[57] ABSTRACT

A process is disclosed for the production of water soluble ammonium phosphates, comprising the following steps:

(a) to react in a reaction step ammonia and untreated phosphoric acid with $P_2O_5$ concentration comprised within the range of from 30 to 54%, outcoming from wet processes;

(b) to filter under high temperature conditions the reaction suspension, separating the impurity-containing sludges from an aqueous solution of ammonium phosphate;

(c) to cool and crystallize the aqueous solution of ammonium phosphate;

(d) to separate the formed ammonium phosphate crystals from the mother liquors.

14 Claims, 2 Drawing Figures

PROCESS FOR THE PRODUCTION OF WATER SOLUBLE AMMONIUM PHOSPHATES

The present invention relates to a process for the production of water soluble crystalline ammonium phosphates of technical grade.

The technical grade crystalline ammonium phosphates, such as required e.g. for the production of water soluble fertilizers, must fulfil the requisite of a high purity level mainly as for the metal cations, which conditions their solubility characteristics.

Several processes are known for the production of such ammonium phosphates, but such methods either require complex processes for the treatment and purification of phosphoric acid before the reaction thereof with ammonia, or expensive ion-exchange treatments.

In U.S. Pat. No. 2,891,856 on the contrary a process is disclosed starting from phosphoric acid manufactured by means of a wet process, wherein the phosphoric acid with a $P_2O_5$ concentration comprised within the range of from 20 to 28% is reacted with ammonia.

It is stated in such patent that a phosphoric acid of concentration higher than 28% cannot be used, in that it would involve an extremely hardly separable precipitate.

It is known that phosphoric acids from wet processes contain large amounts of anionic and cationic impurities, and that the product from the reaction of such a type of acids with ammonia is constituted by a mud-like suspension of metal phosphates in a lattice of ammonium phosphates.

It has now been surprisingly found that it is possible to produce water soluble ammonium phosphates by using untreated phosphoric acid outcoming from the wet process having a concentration of from 30 to 54% and reacting it with ammonia in a reaction step under determined process conditions, without having the hereinabove mentioned drawbacks.

The process which is the object of the present invention comprises the following steps:

(a) to react in a reaction step ammonia and untreated phosphoric acid, with a $P_2O_5$ concentration comprised within the range of from 30 to 54%, preferably of from 35 to 46%, outcoming from wet processes;

(b) to filter under high temperature conditions the reaction suspension, separating the impurity-containing sludges from an aqueous solution of ammonium phosphate;

(c) to cool and crystallize the solution of ammonium phosphate;

(d) to separate the formed ammonium phosphate crystals from the mother liquors.

By means of such a process either monoammonium phosphates or diammonium phosphates can be obtained.

In order to obtain monoammonium phosphates, the reaction between ammonia and phosphoric acid is carried out at a pH value comprised within the range of from 4 to 4.5, at a temperature comprised within the range of from 80° and 95° C., and with a residence time of from 10 to 30 minutes.

The mother liquors, after having been possibly partly drained in order to reduce the content of organic matter, which would otherways tend to accumulate, may be recycled to the step (c) after having been cooled, and/or to the step (a) after having been heated.

In order to produce diammonium phosphates, the reaction between ammonia and phosphoric acid is carried out at a pH value of from 7.5 to 8, at a temperature of from 80° to 95° C., and with a residence time of from 10 to 30 minutes.

The mother liquors, after having been possibly partly drained, may be cooled and recycled to step (c).

As an alternative, always to the purpose of producing diammonium phosphates, the reaction between ammonia and phosphoric acid may be carried out at a pH value comprised within the range of from 4 to 4.5, at a temperature of from 80° to 95° C., and with a residence time comprised within the range of from 10 to 30 minutes, i.e., by operating under the same conditions as for obtaining monoammonium phosphate, but after the high-temperature filtration, it is necessary to react again the aqueous solution of ammonium phosphate with ammonia, operating at a pH value comprised within the range of from 7.5 to 8, at a temperature comprised within the range of from 80° to 95° C. and with a residence time of from 10 to 30 minutes.

The mother liquors, after having been possibly drained, may be recycled to the step (c) after having been cooled, and/or to the step following the high-temperature filtration, wherein the aqueous solution of ammonium phosphate reacts with ammonia, after having been heated.

Going back to the general process, the separation of formed crystals of monoammonium phosphate or of diammonium phosphate may occur by centrifugation.

Said crystals, after the separation from the mother liquors, may be possibly dried.

Figure 2:
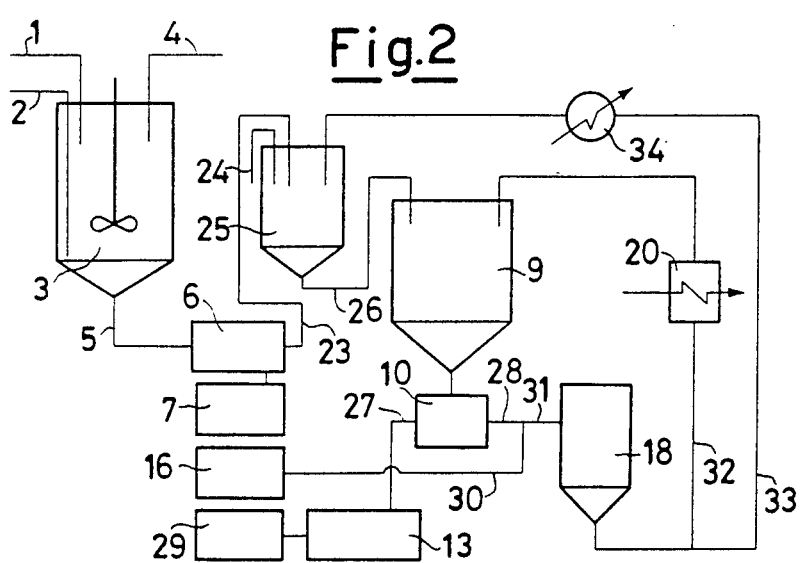

The invention shall be better disclosed with reference to the flow sheets of FIGS. 1 and 2 attached, which are not to be intended as being limitative of the invention.

FIG. 1 shows a process flow sheet for the production of crystalline water soluble monoammonium phosphate.

Untreated phosphoric acid (1) outcoming from a wet process is reacted with ammonia (2) in a reaction vessel (3) wherein fossil meal (4) may be possibly added to the purpose of favouring the subsequent filtration. The reaction suspension (5) leaving the reactor is filtered at high temperature in a filter (6), by means of which the impurity containing sludges (7) are separated from an acqueous solution of monoammonium phosphate (8) which is sent into a crystallizer (9) and then centrifuged (10).

From the centrifugation, the ammonium phosphate crystals (11) are separated from the mother liquors (12). The crystals are then dried in a dryer (13), the crystalline monoammonium phosphate (14) being finally obtained. A portion (15) of mother liquors is drained in (16), the balance (17) thereof is sent to a mother liquor tank (18). From this tank the mother liquors are partly (19) recycled to the crystallizer (9) after having been cooled in (20), and partly (21) are recycled to the reaction vessel (3) after having been heated in (22).

The drainage (16) of a portion of the mother liquors makes it possible to reduce the content of organic substances, which would otherways tend to accumulate within the reactor (3).

FIG. 2 represents a process flow sheet for the production of crystalline water soluble diammonium phosphate. Untreated phosphoric acid (1) outcoming from a wet process is reacted with ammonia (2) within a reaction vessel (3) into which fossil flour (4) may be possibly added.

The reaction suspension (5) leaving the reactor is filtered at high temperature in a filter (6) by means of which the sludges (7) containing impurities (Al, Fe, Mg and so on) are separated from an acqueous solution of ammonium phosphate (23). The aqueous solution (23) is in its turn reacted with ammonia (24) inside a reaction vessel (25).

From the reactor (25) an aqueous solution of diammonium phosphate (26) comes out, which is delivered into a crystallizer (9) and then centrifuged (10).

From the centrifugation, the diammonium phosphate crystals (27) are separated from the mother liquors (28). The crystals are subsequently dried in a dryer (13), crystalline diammonium phosphate (29) being finally obtained. A portion (30) of the mother liquors is drained in (16), the balance (31) thereof is sent into a mother liquor tank (18). From this tank, the mother liquors are partly (32) recycled to the crystallizer (9) after having been cooled in (20), and partly (33) recycled to the reactor (25) after having been heated in (34).

Two Examples will be now given to the purpose of better illustrating the invention, such Examples however being not to be considered as being limitative of the invention.

EXAMPLE 1

An amount of 200.7 g of $H_3PO_4$ containing 45.4% of $P_2O_5$, whose composition is shown in Table 1, have been diluted with 102 g of a saturated solution of monoammonium phosphate containing 22% of $P_2O_5$ and reacted with ammonia up to a pH value of 4.4. The temperature has been kept at about 85° C.

The reaction suspension has been filtered at the same temperature, 50.6 g of sludges containing about 30% of $P_2O_5$ and a monoammonium phosphate solution being obtained.

From such a solution a crystalline monoammonium phosphate has been obtained by cooling to about 27°–30° C., whose characteristics are reported in same Table 1.

The $P_2O_5$ yield has been calculated to be of about 70%, but it can be increased by washing the sludges with a small amount of hot water (80°–90° C.).

The mother liquors saturated at about 27°–30° C. contain about 20% of $P_2O_5$ and may be recycled into the reaction vessel.

TABLE 1

| Percentage of | $H_3PO_4$ | Monoammonium Phosphate |
|---|---|---|
| N | — | 12.2 |
| $P_2O_5$ | 45.4 | 60.8 |
| $SO_4$ | 3.9 | 1.3 |
| Solids | 0.52 | — |
| F | 0.73 | 0.26 |
| Fe | 0.56 | 0.12 |
| Mg | 0.16 | 0.017 |
| Ca | 0.027 | 0.012 |
| Al | 0.31 | 0.043 |
| Insoluble residue | — | 0.91 |

EXAMPLE 2

In a test carried out in the continuously operating pilot plant, assembled according to the flow sheet of FIG. 1, to the reactor (3) 23 kg/h of $H_3PO_4$ at 45% concentration (1), whose composition is reported in Table 2, 2.170 l/h of anhydrous $NH_3$ (2), 0.160 kg/h of fossil flour (4) and 2.510 kg/h of water have been fed. pH value has been maintained at 4.4 and the temperature at about 95° C.

The suspension leaving the reactor (5) was delivered, at the same temperature, to the filter (6), from which 16.800 kg/h of saturated solution of monoammonium phosphate were separated, sent to the crystallizer (9) wherein they were cooled at 40° C. by heat exchange with water.

At the outlet from the crystallizer (9) 7.640 kg/h of moist monoammonium phosphate were obtained, which, when dried, yielded 7.160 kg/h of crystalline monoammonium phosphate, whose characteristics are reported in same Table 2.

TABLE 2

| Percentage of | $H_3PO_4$ | Monoammonium Phosphate |
|---|---|---|
| N | — | 12.0 |
| $P_2O_5$ | 45.0 | 60.7 |
| $SO_4^=$ | 3.14 | 1.0 |
| Solids | 1.90 | — |
| $F^-$ | 1.12 | 0.29 |
| Fe | 0.91 | 0.045 |
| Mg | 0.09 | 0.0019 |
| Ca | 0.23 | 0.050 |
| Al | 0.29 | 0.035 |
| Insoluble residue | — | 0.30 |

We claim:

1. Process for the production of water soluble ammonium phosphates, comprising
   (a) reacting ammonia and untreated wet process phosphoric acid having a $P_2O_5$ concentration of from 30 to 54%, at a pH of from 4 to 4.5 or 7.5 to 8 and a temperature of from 80° to 95° C., for a period of from 10 to 30 minutes;
   (b) filtering under high temperature conditions the reaction suspension, separating the impurity-containing sludges from an aqueous solution of ammonium phosphate;
   (c) cooling and crystallizing the ammonium phosphate aqueous solution; and
   (d) separating the formed crystals of ammonium phosphate from the mother liquor.

2. Process according to claim 1 wherein the ammonium phosphate is monoammonium phosphate.

3. Process according to claim 1 wherein the mother liquor, after having been partly drained, is heated and recycled into the reaction step, as per item (a).

4. Process according to claim 1 characterized in that following the high-temperature filtration, the aqueous solution of ammonium phosphate is reacted again with ammonia, operating at a pH value comprised within the range of from 7.5 to 8, at a temperature comprised within the range of from 80° to 95° C. and with a residence time of from 10 to 30 minutes.

5. Process according to claim 1 wherein the ammonium phosphate crystals are crystals of diammonium phosphate.

6. Process according to claim 1 wherein the mother liquor, after having been partly drained, is heated and recycled to the step following the high-temperature filtration, wherein the aqueous solution of ammonium phosphate reacts with ammonia.

7. Process according to claim 1, wherein the phosphoric acid in the reaction as per item (a) has a content of $P_2O_5$ comprised within the range of from 35 to 46%.

8. Process according to claim 1, wherein the separation of the formed ammonium phosphate crystals from the mother liquors occurs by centrifugation.

9. Process according to claim 1, wherein the formed crystals of ammonium phosphate are dried after having been separated.

10. Process according to claim 1, wherein the mother liquor, after having been partly drained, is cooled and recycled to step (c).

11. Process according to claim 1 wherein the mother liquor, after having been partly drained, is partly cooled and recycled to step (c), and partly heated and recycled to reaction step (a).

12. Process according to claim 1 wherein the mother liquor, after having been partly drained, is partly cooled and recycled to step (c), and partly heated and recycled to the step following the high-temperature filtration wherein the aqueous solution of ammonium phosphate reacts with ammonia.

13. Process for the production of water soluble monoammonium phosphate, consisting essentially of:
   (a) reacting ammonia and untreated wet process phosphoric acid having a $P_2O_5$ concentration of from 30 to 54%, at a pH of from 4 to 4.5 and a temperature of from 80° to 95° C., for a period of from 10 to 30 minutes;
   (b) filtering under high temperature conditions the reaction suspension, separating the impurity-containing sludges from an aqueous solution of monoammonium phosphate;
   (c) cooling and crystallizing the monoammonium phosphate aqueous solution; and
   (d) separating the formed crystals of monoammonium phosphate from the mother liquor.

14. Process for the production of water soluble diammonium phosphate, consisting essentially of:
   (a) reacting ammonia and untreated wet process phosphoric acid having a $P_2O_5$ concentration of from 30 to 54%, at a pH of from 7.5 to 8 and a temperature of from 80° to 95° C., for a period of from 10 to 30 minutes;
   (b) filtering under high temperature conditions the reaction suspension, separating the impurity-containing sludges from an aqueous solution of diammonium phosphate;
   (c) cooling and crystallizing the diammonium phosphate aqueous solution; and
   (d) separating the formed crystals of diammonium phosphate from the mother liquor.

* * * * *